United States Patent
Mohs et al.

(10) Patent No.: US 9,103,038 B2
(45) Date of Patent: Aug. 11, 2015

(54) ACIDIC COMPOSITIONS INCLUDING REDUCING AGENTS FOR SCALE AND DECOLORIZATION OF METAL STAINS

(75) Inventors: Thomas R. Mohs, Eagan, MN (US); Jennifer Bergerson, Mounds View, MN (US)

(73) Assignee: ECOLAB USA INC., St. Paul, MN (US)

( * ) Notice: Subject to any disclaimer, the term of this patent is extended or adjusted under 35 U.S.C. 154(b) by 452 days.

(21) Appl. No.: 13/482,289

(22) Filed: May 29, 2012

(65) Prior Publication Data

US 2013/0319467 A1 Dec. 5, 2013

(51) Int. Cl.

| | |
|---|---|
| C23F 14/02 | (2006.01) |
| C11D 3/04 | (2006.01) |
| C11D 3/20 | (2006.01) |
| C11D 3/22 | (2006.01) |
| C11D 3/32 | (2006.01) |
| C11D 7/08 | (2006.01) |
| C11D 7/10 | (2006.01) |
| C11D 7/26 | (2006.01) |
| C11D 7/32 | (2006.01) |
| C11D 7/34 | (2006.01) |
| C02F 5/08 | (2006.01) |
| C11D 3/34 | (2006.01) |

(52) U.S. Cl.
CPC ............... *C23F 14/02* (2013.01); *C11D 3/042* (2013.01); *C11D 3/046* (2013.01); *C11D 3/2034* (2013.01); *C11D 3/2058* (2013.01); *C11D 3/2065* (2013.01); *C11D 3/2075* (2013.01); *C11D 3/2086* (2013.01); *C11D 3/2089* (2013.01); *C11D 3/2096* (2013.01); *C11D 3/225* (2013.01); *C11D 3/323* (2013.01); *C11D 7/08* (2013.01); *C11D 7/10* (2013.01); *C11D 7/261* (2013.01); *C11D 7/265* (2013.01); *C11D 7/267* (2013.01); *C11D 7/3272* (2013.01); *C11D 7/34* (2013.01); *C02F 5/08* (2013.01); *C11D 3/3427* (2013.01)

(58) Field of Classification Search
CPC . C11D 17/0056; C11D 3/042; C11D 17/0047
USPC .................................................. 510/191, 447
See application file for complete search history.

(56) References Cited

U.S. PATENT DOCUMENTS

| 5,759,974 A * | 6/1998 | Menke et al. ................. 510/191 |
|---|---|---|
| 7,378,380 B2 * | 5/2008 | Blagg et al. ................... 510/108 |
| 2002/0004471 A1 * | 1/2002 | Rader et al. ................... 510/191 |

(Continued)

FOREIGN PATENT DOCUMENTS

| JP | 4-354898 A | 12/1992 |
|---|---|---|
| WO | WO 2008/046449 A1 | 4/2008 |

(Continued)

OTHER PUBLICATIONS

JP 4-354898, Sakurai Kazuo published Dec. 9, 1992—English Abstract.

(Continued)

*Primary Examiner* — Gregory Webb
(74) *Attorney, Agent, or Firm* — McKee, Voorhees & Sease, PLC (57) ABSTRACT

An acidic destaining composition for removing hard water and metal stains is disclosed. The composition comprises an acid in combination with a reducing agent and may preferably be formulated as a solid.

19 Claims, 1 Drawing Sheet

(56) References Cited

U.S. PATENT DOCUMENTS

| | | | |
|---|---|---|---|
| 2002/0175092 A1* | 11/2002 | Stulens et al. | 206/229 |
| 2002/0193270 A1* | 12/2002 | Cermenati et al. | 510/302 |
| 2002/0193278 A1* | 12/2002 | Cermenati et al. | 510/465 |
| 2004/0072710 A1* | 4/2004 | McKechnie et al. | 510/302 |
| 2004/0183050 A1* | 9/2004 | Hei et al. | 252/188.1 |
| 2004/0194810 A1* | 10/2004 | Strothoff et al. | 134/25.2 |
| 2005/0137107 A1* | 6/2005 | Griese et al. | 510/220 |
| 2006/0079424 A1 | 4/2006 | Perry | |
| 2006/0093570 A1 | 5/2006 | Duddington et al. | |
| 2008/0045433 A1* | 2/2008 | Blagg et al. | 510/438 |
| 2009/0105111 A1* | 4/2009 | Stolte et al. | 510/392 |
| 2009/0208763 A1 | 8/2009 | Harris | |
| 2009/0233835 A1 | 9/2009 | Cermenati et al. | |
| 2009/0260659 A1 | 10/2009 | Choczaj et al. | |
| 2009/0270304 A1 | 10/2009 | Cermenati et al. | |
| 2009/0298738 A1 | 12/2009 | Kneipp et al. | |
| 2010/0154823 A1 | 6/2010 | Cermenati et al. | |
| 2010/0263668 A1 | 10/2010 | Monsrud et al. | |
| 2011/0160114 A1 | 6/2011 | Smith et al. | |

FOREIGN PATENT DOCUMENTS

| | | |
|---|---|---|
| WO | WO 2009/133465 A3 | 5/2009 |
| WO | WO 2009/125305 A2 | 10/2009 |
| WO | WO 2009/133465 A2 | 11/2009 |

OTHER PUBLICATIONS

WO 2009/133465 A2, Diversey, Inc. published Nov. 5, 2009—English Abstract.

Balaji, V. et al., "Studies on the Process Development for the Chemical Decontamination of Stainless-Steel Systems: Novel Observations", Ind. Eng. Chem. Res. 2006, 45, 4461-4470.

WO 2009/133465, Johnsondiversey, Inc.—English.

Ecolab USA Inc., PCT/US2013/042887, filed on May 28, 2013, "The International Search Report and the Written Opinion of the International Searching Authority, or the Declaration", mail date Sep. 5, 2013.

\* cited by examiner

ACIDIC COMPOSITIONS INCLUDING REDUCING AGENTS FOR SCALE AND DECOLORIZATION OF METAL STAINS

FIELD OF THE INVENTION

The present invention relates to acidic compositions with specific reducing agents for treatment and removal of metal staining including stain elimination and decolorization of metal containing stains as well as other hard water stains on a variety of surfaces. The compositions can be used for reducing scale, deliming equipment, rinsing, hard surface cleaning, ware washing and the like on industrial, commercial, institutional, and consumer surfaces.

BACKGROUND OF THE INVENTION

The level of hardness in water can have a deleterious effect in many cleaning systems. For example, when hard water alone, or in conjunction with cleaning compositions, contacts a surface, it can cause precipitation of hard water scale on the contacted surface. Water can contain magnesium and calcium which can cause scale deposit and other metal ions such as iron, manganese and copper which produce stains that are very difficult to remove. In general, hard water refers to water having a total level of calcium and magnesium ions in excess of about 100 ppm expressed in units of ppm calcium carbonate. Although most locations have hard water, water hardness tends to vary from one location to another.

Chelating agents and/or threshold agents are often used in cleaners because of their ability to solubilize and/or prevent calcium and magnesium salts from precipitating. When calcium and magnesium salts precipitate, the crystals may attach to the surface being cleaned and cause undesirable effects in a variety of cleaning systems. For example, calcium carbonate precipitation on the surface of ware can negatively impact the aesthetic appearance of the ware, giving an unclean look. In a region with high levels of metal ions in water, staining can be a significant issue.

It is known to use acidic compositions to clean hard surfaces and that such formulations show good overall cleaning performance and good limescale removal and prevention. Indeed, for example WO 2004/018599 describes acidic hard surface cleaning compositions comprising an acid or a mixture thereof.

However, there are limitations to the convenience of acidic compositions employed as surface cleaners. It is known that some hard surfaces, such as enamel and several metals, e.g. aluminum, are sensitive to acids and may be severely damaged by acidic compositions used to clean said surfaces.

The type of acid used has also presented problems in development of acid cleaners. Most acid cleaners are based upon phosphoric acid due to its low cost, good combining ability with other ingredients, its ability to exert a very strong synergistic cleaning affect, and its low corrosivity, however, phosphoric acid has recently fallen out of favor due to environmental concerns.

Liquid compositions are also less economical as they have increased transportation costs. Solid products are generally more convenient, safe and economical also because they do not spill or splash, have reduced manufacturing and distribution costs, and require less storage space. However, solid products must first be converted to a liquid before they can be used in most applications. Typically, a product dispenser is used to bring water into contact with a solid product in order to dissolve the solid product and produce a resulting liquid "use" solution that can be transferred to a vessel or onto a surface to be cleaned.

It is therefore one object of this invention to provide a phosphate free acid composition which has excellent scale removal performance without the use of phosphoric acid.

It another object of the present invention to provide an acidic composition that can be manufactured in solid form and that is easily dissolved into a use solution.

It is another object of the present invention to provide an acidic surface treating/acidic destaining composition that provides good limescale removal performance whilst showing a good surface safety profile on the treated surface.

In particular, it is an objective of the present invention to provide a liquid or solid composition which may be used in combination with a variety of hard surface cleaners that provides an acceptable limescale stain removal.

It is yet another object of the present invention to provide an acidic composition in combination with reducing agents to decolorize and remove metal containing stains.

Other objects, aspects and advantages of this invention will be apparent to one skilled in the art in view of the following disclosure, the drawings, and the appended claims.

SUMMARY OF THE INVENTION

The present invention relates to acidic compositions that dissolve scale composed of calcium and magnesium carbonate, and remove or decolorize metal stains composed of iron, manganese or copper. The acidic composition produces little deleterious effect on the surface treated and can be formulated in a number of delivery formats including solid for ease of transport and convenience.

The acidic composition comprises the following components as active ingredients at the following ratios based on the entire composition, (a) an inorganic or organic acid of 0.001 to 50 weight %; and (b) a reducing agent of 0.01-10 weight %. In some embodiments the invention also includes (c) an urea compound 0.01 to 6 weight %, for making a solid acidic composition and in some embodiments the reducing agent may be coated to prevent negative interaction with dyes, formula components or other storage conditions.

The present invention relates to acid compositions for elimination of metal staining and metal deposits or decolorization of metal stains on a variety of hard surfaces in a variety of applications including cleaning of hard surfaces such as bathrooms, toilets, garages, driveways, basements, gardens, kitchens, food and beverage equipment, medical instruments, destaining instrument washers, removal of iron staining of vehicles from clays with high iron content, decolorization of water influent or effluent containing metal components, dish machine destaining, decolorization of food stains on flatware, and food contact surfaces. Elimination of metal staining on dish machines, customer ware, staining on concrete or other hard surfaces, textiles dish machines, customer ware, staining on concrete or other hard surfaces, and decolorization of food stains on flatware and food contact surfaces.

Applicants have found, that the combination of traditional acids, preferably organic acids, with an appropriate reducing agent works well and based upon treatment time, can remove/decolor many metal staining issues. The invention employs an aqueous solution of a pH of less than 7, which uses an acid as the treating component. Any inorganic or organic acid used in an acidic composition may be combined with the specific reducing agents according to the invention, such as acetic acid, citric acid, oxalic acid, and sulfuric acid, all of which are traditionally used in acid cleaning compositions. In a preferred embodiment, the acid is one other than phosphoric acid.

DETAILED DESCRIPTION OF THE PREFERRED EMBODIMENT

Figure 1:
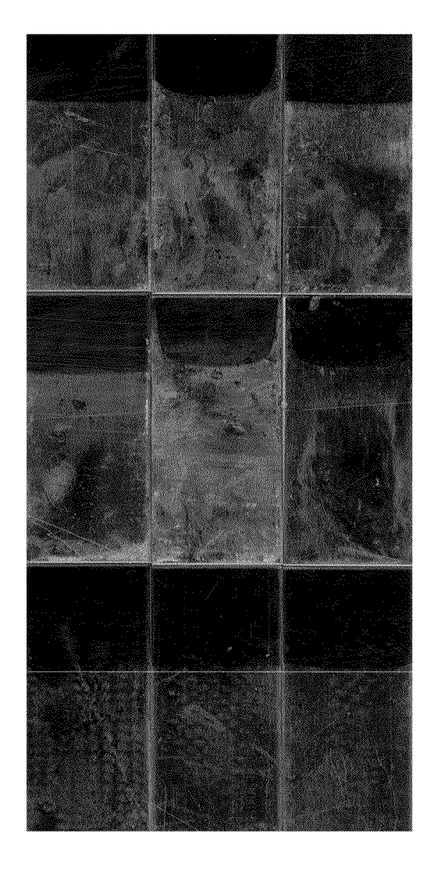
FIG. 1 shows tiles treated with the composition of the invention compared to the commercially available acidic an acidic stain remover, Solid limeaway (SLAW). Top row: 1% Catechol added to Experimental SLAW formula used at 1.5% in solution, soaks between 7-8 minutes. Middle row: 1% Maltol added to Experimental SLAW formula used at 1.5% in solution at various times, soaks between 2-5 minutes. Bottom row: Inline SLAW 1.5% in solution after 15 minutes

So that the invention maybe more readily understood, certain terms are first defined and certain test methods are described.

As used herein, the terms "chelating agent" and "sequestrant" refer to a compound that forms a complex (soluble or not) with water hardness ions (from the wash water, soil and substrates being washed) in a specific molar ratio. Chelating agents that can form a water soluble complex include sodium tripolyphosphate, EDTA, DTPA, NTA, citrate, and the like. Sequestrants that can form an insoluble complex include sodium triphosphate, zeolite A, and the like. As used herein, the terms "chelating agent" and "sequestrant" are synonymous.

As used herein, the term "threshold agent" refers to a compound that inhibits crystallization of water hardness ions from solution, but that need not form a specific complex with the water hardness ion. This distinguishes a threshold agent from a chelating agent or sequestrant. Threshold agents include a polyacrylate, a polymethacrylate, an olefin/maleic copolymer, and the like.

As used herein, the term "antiredeposition agent" refers to a compound that helps keep a soil composition suspended in water instead of redepositing onto the object being cleaned.

As used herein, the term "phosphate-free" or "substantially phosphate-free" refers to a composition, mixture, or ingredient that does not contain a phosphate or phosphate-containing compound or to which a phosphate or phosphate-containing compound has not been added. Should a phosphate or phosphate-containing compound be present through contamination of a phosphate-free composition, mixture, or ingredients, the amount of phosphate shall be less than about 1.0 wt %. In some embodiments, the amount of phosphate is less than about 0.5 wt %. In other embodiments, the amount of phosphate is less than about 0.1 wt %. In still yet other embodiments, the amount of phosphate is less than about 0.01 wt %.

As used herein, the term "phosphorus-free" or "substantially phosphorus-free" refers to a composition, mixture, or ingredient that does not contain phosphorus or a phosphorus-containing compound or to which phosphorus or a phosphorus-containing compound has not been added. Should phosphorus or a phosphorus-containing compound be present through contamination of a phosphorus-free composition, mixture, or ingredients, the amount of phosphorus shall be less than about 1.0 wt %. In some embodiments, the amount of phosphorous is less than about 0.5 wt %. In other embodiments, the amount of phosphorus is less than about 0.1 wt %. In still yet other embodiments, the amount of phosphorus is less than about 0.01 wt %.

"Cleaning" means to perform or aid in soil removal, bleaching, microbial population reduction, or combination thereof.

As used herein, the term "ware" refers to items such as eating and cooking utensils and other hard surfaces such as showers, sinks, toilets, bathtubs, countertops, windows, mirrors, transportation vehicles, and floors. As used herein, the term "warewashing" refers to washing, cleaning, or rinsing ware.

As used herein, the term "hard surface" includes showers, sinks, toilets, bathtubs, countertops, windows, mirrors, transportation vehicles, floors, and the like.

As used herein, the phrase "health care surface" refers to a surface of an instrument, a device, a cart, a cage, furniture, a structure, a building, or the like that is employed as part of a health care activity. Examples of health care surfaces include surfaces of medical or dental instruments, of medical or dental devices, of autoclaves and sterilizers, of electronic apparatus employed for monitoring patient health, and of floors, walls, or fixtures of structures in which health care occurs. Health care surfaces are found in hospital, surgical, infirmity, birthing, mortuary, and clinical diagnosis rooms. These surfaces can be those typified as "hard surfaces" (such as walls, floors, bed-pans, etc.,), or fabric surfaces, e.g., knit, woven, and non-woven surfaces (such as surgical garments, draperies, bed linens, bandages, etc.,), or patient-care equipment (such as respirators, diagnostic equipment, shunts, body scopes, wheel chairs, beds, etc.,), or surgical and diagnostic equipment. Health care surfaces include articles and surfaces employed in animal health care.

As used herein, the term "instrument" refers to the various medical or dental instruments or devices that can benefit from cleaning using water treated according to the methods of the present invention.

As used herein, the phrases "medical instrument," "dental instrument," "medical device," "dental device," "medical equipment," or "dental equipment" refer to instruments, devices, tools, appliances, apparatus, and equipment used in medicine or dentistry. Such instruments, devices, and equipment can be cold sterilized, soaked or washed and then heat sterilized, or otherwise benefit from cleaning using water treated according to the present invention. These various instruments, devices and equipment include, but are not limited to: diagnostic instruments, trays, pans, holders, racks, forceps, scissors, shears, saws (e.g. bone saws and their blades), hemostats, knives, chisels, rongeurs, files, nippers, drills, drill bits, rasps, burrs, spreaders, breakers, elevators, clamps, needle holders, carriers, clips, hooks, gouges, curettes, retractors, straightener, punches, extractors, scoops, keratomes, spatulas, expressors, trocars, dilators, cages, glassware, tubing, catheters, cannulas, plugs, stents, scopes (e.g., endoscopes, stethoscopes, and arthoscopes) and related equipment, and the like, or combinations thereof.

As used herein, a solid acidic destaining composition refers to a acidic destaining composition in the form of a solid such as a powder, a flake, a granule, a pellet, a tablet, a lozenge, a puck, a briquette, a brick, a solid block, a unit dose, or another solid form known to those of skill in the art. The term "solid" refers to the state of the detergent composition under the expected conditions of storage and use of the acidic destaining composition. In general, it is expected that the detergent composition will remain in solid form when exposed to temperatures of up to about 100° F. and greater than about 120° F.

By the term "solid" as used to describe the processed composition, it is meant that the hardened composition will not flow perceptibly and will substantially retain its shape under moderate stress or pressure or mere gravity, as for example, the shape of a mold when removed from the mold, the shape of an article as formed upon extrusion from an extruder, and the like. The degree of hardness of the solid cast composition can range from that of a fused solid block which is relatively dense and hard, for example, like concrete, to a consistency characterized as being malleable and sponge-like, similar to caulking material.

As used herein, "weight percent (wt-%)," "percent by weight," "% by weight," and the like are synonyms that refer to the concentration of a substance as the weight of that substance divided by the total weight of the composition and multiplied by 100.

As used herein, the term "about" modifying the quantity of an ingredient in the compositions of the invention or employed in the methods of the invention refers to variation in the numerical quantity that can occur, for example, through typical measuring and liquid handling procedures used for making concentrates or use solutions in the real world; through inadvertent error in these procedures; through differences in the manufacture, source, or purity of the ingredients employed to make the compositions or carry out the methods; and the like. The term about also encompasses amounts that differ due to different equilibrium conditions for a composition resulting from a particular initial mixture. Whether or not modified by the term "about," the claims include equivalents to the quantities.

It should be noted that, as used in this specification and the appended claims, the singular forms "a," "an," and "the" include plural referents unless the content clearly dictates otherwise. Thus, for example, reference to a composition containing "a compound" includes a composition having two or more compounds. It should also be noted that the term "or" is generally employed in its sense including "and/or" unless the content clearly dictates otherwise.

"As used herein, the term "ware" includes items such as eating and cooking utensils. As used herein, the term "warewashing" refers to washing, cleaning, or rinsing ware.

The recitation of numerical ranges by endpoints includes all numbers subsumed within that range (e.g. 1 to 5 includes 1, 1.5, 2, 2.75, 3, 3.80, 4, and 5).

According to the invention, application have created a preferably phosphate free acid composition which may be used in place of traditional phosphoric acid metal stain treatment compositions, which retains the cleaning and anti-corrosive properties of the same and which is biodegradable and less expensive to produce. The composition will find use in any cleaning situation where phosphoric acid based stain removers, rinses, hard surface cleaners etc. can be used.

The Acidic Metal Stain Treatment Composition

The acidic hard surface acidic destaining compositions according to the present invention may be an aqueous composition. Therefore, they may comprise from about 70% to about 99% by weight of the total composition of water, preferably from about 75% to about 95% and more preferably from about 80% to about 95%.

The compositions of the present invention are acidic. Indeed, they typically have a pH comprised between about 3 and about 4, preferably from about 3.1 to about 3.9, more preferably from about 3.2 to about 3.9, even more preferably about 3.5 to about 4.0, and most preferably from about 3.6 to about 3.9.

The pH of the acidic destaining compositions herein, as is measured at 25° C., is at least about 3, with increasing preference in the order given, about 3.1, 3.2, 3.3, 3.4, or 3.5. The pH of the acidic destaining compositions herein, as is measured at 25° C., is no more than about 4, preferably with increasing preference in the order given, about 4, 3.9, 3.8, 3.7 or 3.6.

The compositions herein may accordingly comprise an alkaline material. Indeed, an alkaline material may be present to trim the pH and/or maintain the pH of the compositions according to the present invention. Examples of alkaline material are sodium hydroxide, potassium hydroxide and/or lithium hydroxide, and/or the alkali metal oxides such, as sodium and/or potassium oxide or mixtures thereof and/or alkali metal carbonates or bicarbonates such as sodium or potassium carbonate/bicarbonate. Other suitable bases include ammonia, ammonium carbonate and hydrogen carbonate, choline base, etc. Preferably, source of alkalinity is sodium hydroxide or potassium hydroxide, preferably potassium hydroxide. Indeed, it has been found that potassium hydroxide, if present, further contributes to the improved surface safety profile of the compositions herein.

Typically the amount of alkaline material is of from about 0.001% to about 20% by weight, preferably from about 0.01% to about 10% and more preferably from about 0.1% to about 3% by weight of the composition. Despite the presence of alkaline material, if any, the compositions herein would remain acidic compositions (i.e., formulated with a pH below 7).

Acid System

The acid compositions of the present invention have pKa values of less than or equal to 3. Suitable additional acidulants or acids include organic acids. For example, suitable organic acids include lactic acid, citric acid, propionic acid, acetic acid, hydroxyacetic acid, formic acid, glutaric acid, malic acid, hydroxy propionic acid, succinic acid, glutaric acid, adipic acid, fumaric acid, mixtures thereof, or the like. The organic acid can be a mixture of adipic, malic, and succinic acids sold under the tradename Sokalan. In an embodiment, the acid includes citric acid, lactic acid, urea hydrochloride, or a mixture thereof. In another aspect, suitable acids include inorganic or mineral acids, such as, for example, hydrochloric acid, nitric acid, sulfuric acid, sulfamic acid, urea dihydrogen sulfate and mixtures thereof, or the like, but not including phosphoric acid. In an embodiment, the present invention includes a combination of acidulants, such as, for example, citric acid, sulfamic, sulfuric, or a mixture thereof.

The acidulant or acid can be present in the composition at about 0.001 to about 50 wt-%, about 0.01 to about 40 wt-%, about 0.1 to about 30 wt-%.

Reducing Agent

Another component of the invention composition includes a reducing agent. In at least one embodiment, it is proposed that the reducing agent can effectively reduce the metal on the surface to be cleaned which is the cause of the visible stain to be reduced from the stable oxidation state which would be common in an acidic oxidizing environment to a less stable or reduced form which is then more readily soluble in the aqueous solution. Without wishing to be bound by theory, chelating agents for metal ions are typically most effective when deprotonated, or above their pKa value. Under acidic conditions, such as for example, deliming applications, chelants are generally not very effective at removing metal stains due to the pH of the solution generally below the pKa value of the chelant. Hence, the chelant remains predominately in the protonated form. A variety of reducing agents can be employed in the invention.

The following reducing agents have shown benefits in this acidic system: Ascorbic Acid, Sodium Metabisulfite, 3,3-Thiodipropionic, Caffeic Acid, Syringic Acid, Magnesium L-Ascorbate, Maltol, Ethyl Maltol, Sodium Hydrosulfite, Catechol, Benzyl Alcohol, trans-Cinnamic Acid, Hydroquinone, Pyrogallol, p-Coumaric Acid, Mucic Acid, Gallic Acid and Hydroxypropyl Cellulose. These reducing agents can be incorporated directly into the formula or coated with a material to prevent negative interaction with other components in the formulation, or for safety or stability.

The amount of reducing agent is not critical, and more is generally better. Economies of cost, time and formula preparation will likely dictate the amount used. A higher content of reducing agent reduces the time needed to remove/decolorize stains.

In at least one embodiment of the invention, the reducing agent is present in an amount from about 0.01 to about 10 weight percent, from about 0.05 to about 8 weight percent, and from about 0.1 to about 5 weight percent actives.

Solidification Agents

The acidic compositions may also include solidification components when the composition is formulated in solid form. A solidification agent is a compound or system of compounds, organic or inorganic, which significantly contributes to the uniform solidification of the composition. The solidification agent should be compatible with the any other active ingredients of the composition and should be capable of providing an effective amount of hardness and/or aqueous solubility to the processed composition. The solidification agents should also be capable of forming a homogeneous matrix with the any other ingredients when mixed and solidified to provide a uniform dissolution of the composition during use.

The amount of solidification agent included in the acidic composition will vary according to factors including, but not limited to: the type of composition being prepared, the ingredients of the composition, the intended use of the composition, the quantity of dispensing solution applied to the composition over time during use, the temperature of the dispensing solution, the hardness of the dispensing solution, the physical size of the composition, and the concentration of the other ingredients. The amount of the solidification agent included in the solid acidic composition should be effective to combine other ingredients of the composition to form a homogeneous mixture under continuous mixing conditions and a temperature at or below the melting temperature of the solidification agent.

The solidification agent may also form a matrix with the other ingredients which will harden to a solid form under ambient temperatures of about 30° C. to about 50° C., particularly about 35° C. about 45° C., after mixing ceases and the mixture is dispensed from the mixing system, within about 1 minute to about 3 hours, particularly about 2 minutes to about 2 hours, and particularly about 5 minutes to about 1 hour. A minimal amount of heat from an external source may be applied to the mixture to facilitate processing of the mixture. The amount of the solidification agent included in the acidic to composition should be effective to provide a desired hardness and desired rate of controlled solubility of the processed composition when placed in an aqueous medium to achieve a desired rate of dispensing the cleaning agent from the solidified composition during use.

The solidification agent may be an organic or an inorganic solidification agent. A particular organic solidification agent is a polyethylene glycol (PEG) compound. The solidification rate of acidic compositions comprising a polyethylene glycol solidification agent will vary, at least in part, according to the amount and the molecular weight of the polyethylene glycol added to the composition. Examples of suitable polyethylene glycols include, but are not limited to: solid polyethylene glycols of the general formula $H(OCH_2CH_2)_nOH$, where n is greater than 15, more particularly about 30 to about 1700. Typically, the polyethylene glycol is a solid in the form of a free-flowing powder or flakes, having a molecular weight of about 1,000 to about 100,000, particularly having a molecular weight of at least about 1,450 to about 20,000, more particularly between about 1,450 to about 8,000. Suitable polyethylene glycol compounds include, but are not limited to: PEG 4000, PEG 1450, and PEG 8000 among others, with PEG 4000 and PEG 8000 being most preferred. An example of a commercially available solid polyethylene glycol includes, but is not limited to: CARBOWAX, available from Union Carbide Corporation, Houston, Tex.

Particular inorganic solidification agents are hydratable inorganic salts, including, but not limited to: sulfates, acetates, and bicarbonates.

Urea particles may also be employed as hardeners in the detergent compositions. The solidification rate of the compositions will vary, at least in part, to factors including, but not limited to: the amount, the particle size, and the shape of the urea added to the detergent composition. For example, a particulate form of urea may be combined with a cleaning agent and other ingredients, as well as a minor but effective amount of water. The amount and particle size of the urea is effective to combine with the cleaning agent and other ingredients to form a homogeneous mixture without the application of heat from an external source to melt the urea and other ingredients to a molten stage. The amount of urea included in the solid composition should be effective to provide a desired hardness and desired rate of solubility of the composition when placed in an aqueous medium to achieve a desired rate of dispensing the cleaning agent from the solidified composition during use. In an exemplary embodiment, the acidic composition includes between about 5% to about 60% by weight urea, particularly between about 10% and about 50% by weight urea, and more particularly between about 20% and about 40% by weight urea.

The urea may be in the form of prilled beads or powder. Prilled urea is generally available from commercial sources as a mixture of particle sizes ranging from about 8-15 U.S. mesh, as for example, from Arcadian Sohio Company, Nitrogen Chemicals Division. A prilled form of urea is milled to reduce the particle size to about 50 U.S. mesh to about 125 U.S. mesh, particularly about 75-100 U.S. mesh, particularly using a wet mill such as a single or twin-screw extruder, a Teledyne mixer, a Ross emulsifier, and the like.

Dissolution Aid

Functional materials of the invention can include a formulated dissolution aid when in solid form containing a wetting or sheeting agent. The dissolution aid component of the present invention can include a water soluble or dispersible low foaming organic material capable of reducing the surface tension of the rinse water to promote sheeting action and to prevent spotting or streaking caused by beaded water after rinsing is completed. This is often used in warewashing processes. Such sheeting agents are typically organic surfactant-like materials having a characteristic cloud point. The cloud point of the surfactant rinse or sheeting agent is defined as the temperature at which a 1 wt-% aqueous solution of the surfactant turns cloudy when warmed.

Suitable sheeting agents, typically include a polyether compound prepared from ethylene oxide, propylene oxide, or a mixture in a homopolymer or block or heteric copolymer structure. Such polyether compounds are known as polyalkylene oxide polymers, polyoxyalkylene polymers or polyalkylene glycol polymers. Such sheeting agents require a region of relative hydrophobicity and a region of relative hydrophilicity to provide surfactant properties to the molecule. Such sheeting agents have a molecular weight in the range of about 500 to 15,000. Certain types of (PO)(EO) polymeric dissolution aids have been found to be useful containing at least one block of poly(PO) and at least one block of poly(EO) in the polymer molecule. Additional blocks of poly(EO), poly PO or random polymerized regions can be formed in the molecule.

Particularly useful polyoxypropylene polyoxyethylene block copolymers are those including a center block of polyoxypropylene units and blocks of polyoxyethylene units to each side of the center block. Such polymers have the formula shown below:

$$(EO)_n\text{-}(PO)_m\text{-}(EO)_n$$

wherein n is an integer of 20 to 60, each end is independently an integer of 10 to 130. Another useful block copolymer are block copolymers having a center block of polyoxyethylene units and blocks of polyoxypropylene to each side of the center block. Such copolymers have the formula:

$$(PO)_n\text{-}(EO)_m\text{-}(PO)_n$$

wherein m is an integer of 15 to 175 and each end are independently integers of about 10 to 30.

The dissolution aid functional material can be in the present in the composition at amounts of about 0 to about 10 wt-%, about 0.01 to about 8 wt-%, or about 0.1 wt-% to about 5 wt-%.

Crystal Modifiers/Threshold Agents

In some embodiments, the compositions of the present invention include a crystal modifier or threshold agent. Exemplary crystal modifier or threshold agents for use with the methods and compositions of the present invention include, but are not limited to, hydroxycarboxylate compounds. As used herein the term "hydroxycarboxylate" or "hydroxycarboxylic acid" refers to compounds including a carboxyl group, which has the formula C(=O)OH, as well as a hydroxy group, i.e., an —OH group, and salts, esters, or anhydrides thereof. Hydroxycarboxylates include, but are not limited to, compounds with one, two, or three carboxyl groups. Hydroxycarboxylates for use in the compositions and methods of the present invention include, for example, tartaric acid, glycolic acid, lactic acid, glyceric acid, citric acid, and salts, esters, or anhydrides thereof. In some embodiments, the hydroxycarboxylate compound is citric acid, and salts, esters, and anhydrides thereof.

Hydroxycarboxylate salts suitable for use in the compositions and methods of the present invention include, but are not limited to, sodium salts (e.g., mono- and di-sodium salts), potassium salts (e.g., mono- and di-potassium salts), calcium salts, lithium salts, amine salts and combinations thereof. In some embodiments, the composition of the present invention includes a salt of a hydroxycarboxylate compound. In some embodiments, the hydroxycarboxylate compound salt includes a tartaric acid salt of the formula $+NR_1R_2R_3R_4$ wherein $R_1$, $R_2$, $R_3$, and $R_4$ are each individually hydrogen, $C_{1-20}$ alkyl, $C_{1-20}$ substituted alkyl and combinations thereof.

Without wishing to be bound by any particular theory, it is thought that the hydroxycarboxylate compound substantially inhibits or reduces the crystallization of water hardness ions from solution. It has been found that the hydroxycarboxylate reduces or inhibits the precipitation of water hardness ions out of solution at much lower levels of hydroxycarboxylate than those needed when using a conventional chelating agent or sequestrant.

For example, in some embodiments, an acidic destaining composition of the present invention including a hydroxycarboxylate compound is diluted such that the molar amount of hydroxycarboxylate compound present in the wash solution is less than the molar amount of hardness ions in the water of the wash solution. In some embodiments, an acidic destaining composition of the present invention including a hydroxycarboxylate compound is diluted such that the hydroxycarboxylate compound is present in the diluted solution at about 10 to about 100 ppm, about 20 ppm to about 100 ppm, or about 40 ppm to about 80 ppm. In still yet other embodiments, an acidic destaining composition of the present invention including a hydroxycarboxylate compound is diluted such that the hydroxycarboxylate compound is present in the diluted solution at about 50 ppm to about 70 ppm. It is to be understood that all ranges and values between these ranges and values are encompassed by the present invention. In a concentrate the crystal modifier functional material can be in the present in the composition at amounts of about 0 to about 60 wt-%, about 10 to about 55 wt-%, or about 20 wt-% to about 50 wt-%.

Corrosion Inhibitor

A corrosion inhibitor is a chemical compound that, when added in small concentrations, stops or slows down corrosion, otherwise referred to as oxidation of metals and alloys. Examples of suitable corrosion inhibitors include those that inhibit corrosion, but that do not significantly interfere with the stain removal activity of the composition. Corrosion inhibitors which may be optionally added to the composition of the invention include silicates, phosphate, magnesium, sulfates, copper, and/or zinc ions. Preferably, the metal ions are provided in a water-soluble form. Examples of useful water-soluble forms of magnesium, copper and zinc ions are the water-soluble salts thereof including the chlorides, nitrates and sulfates of the respective metals. Some preferred corrosion inhibitors include copper sulfate, sodium metasilicate, sodium bicarbonate, potassium silicate and/or sodium silicate. A preferred corrosion inhibitors useful in the present invention, regardless of delivery method, includes copper sulfate pentahydrate. The corrosion inhibitor is present in an amount of from about 0 to about 5 wt-%, about 0.001 to about 3 wt-%, or about 0.01 wt-% to about 1 wt-%.

Defoaming Agents

An effective amount of a defoaming agent for reducing the stability of foam may also be included in the present acidic compositions. The defoaming agent can be provided in an amount of about 0.0001% to about 10 wt-% about 0.001% to about 5 wt-%, or about 0.01% to about 1.0 wt-%. Examples of defoaming agents suitable for use in the present compositions include silicone compounds such as silica dispersed in polydimethylsiloxane, EO/PO block copolymers, alcohol alkoxylates, fatty amides, hydrocarbon waxes, fatty acids, fatty esters, fatty alcohols, fatty acid soaps, ethoxylates, mineral oils, polyethylene glycol esters, alkyl phosphate esters such as monostearyl phosphate, and the like. A discussion of defoaming agents may be found, for example, in U.S. Pat. No. 3,048,548 to Martin et al., U.S. Pat. No. 3,334,147 to Brunelle et al., and U.S. Pat. No. 3,442,242 to Rue et al., the disclosures of which are incorporated by reference herein.

Additional Functional Materials

The destaining composition can include additional components or agents, such as additional functional materials. For the purpose of this application, the term "functional materials" include a material that when dispersed or dissolved in a use and/or concentrate solution, such as an aqueous solution, provides a beneficial property in a particular use. For example, the acidic destaining composition can be formulated in a traditional hard surface cleaning composition for a number of uses as described herein, and additional functional ingredients can include other soil removal components for example. These can include but are not limited to soil-digesting components, surfactants, disinfectants, sanitizers, acidulants, complexing agents, dyes, thickening or gelling agents, and perfumes, as described, for example, in U.S. Pat. No. 7,341,983, incorporated herein by reference. Some particular examples of functional materials are discussed in more detail below, but it should be understood by those of skill in the art and others that the particular materials discussed are given by way of example only, and that a broad variety of other functional materials may be used. For example, many of the functional materials discussed below relate to materials used in cleaning and/or destaining applications, but it should be understood that other embodiments may include functional materials for use in other applications.

Thickening Agents

Thickeners useful in the present invention include those compatible with acidic systems. The viscosity of the composition increases with the amount of thickening agent, and viscous compositions are useful for uses where the acidic destaining composition clings to the surface. Suitable thickeners can include those which do not leave contaminating residue on the surface to be treated. Generally, thickeners which may be used in the present invention include natural gums such as xanthan gum, guar gum, modified guar, or other gums from plant mucilage; polysaccharide based thickeners, such as alginates, starches, and cellulosic polymers (e.g., carboxymethyl cellulose, hydroxyethyl cellulose, and the like); polyacrylates thickeners; and hydrocolloid thickeners, such as pectin. Generally, the concentration of thickener employed in the present compositions or methods will be dictated by the desired viscosity within the final composition. However, as a general guideline, the viscosity of thickener within the present composition ranges from about 0.1 wt-% to about 3 wt-%, from about 0.1 wt-% to about 2 wt-%, or about 0.1 wt-% to about 0.5 wt-%.

pH Modifier

The pH modifier can be an organic or inorganic source of alkalinity or a pH buffering agent. Nonlimiting examples include the alkali metal hydroxides, alkali metal carbonates, alkanolamines, salts of weak organic acids, etc. Suitable pH modifiers include sodium hydroxide, lithium hydroxide, potassium hydroxide, calcium hydroxide, sodium carbonate, lithium carbonate, potassium carbonate, calcium carbonate (in aragonite form), in and mixtures thereof. Suitable pH modifiers include acetate, formate, gluconate, and the like. Suitable pH modifiers have no or only weak calcium sequestration capability at the pH of the use solution.

The pH modifier can be present at amounts of about 0 to about 60 wt-% about 0.5 to about 25 wt-%, about 1 to about 20 wt-%.

Anti-Redeposition Agents

The acidic destaining composition may also include an anti-redeposition agent capable of facilitating sustained suspension of removed stains in a cleaning solution and preventing the removed stains from being redeposited onto the substrate being cleaned. Examples of suitable anti-redeposition agents include fatty acid amides, fluorocarbon surfactants, complex phosphate esters, styrene maleic anhydride copolymers, and cellulosic derivatives such as hydroxyethyl cellulose, hydroxypropyl cellulose, and the like. The composition may include about 0 to about 10 wt-%, e.g., about 1 to about 5 wt-% of an anti-redeposition agent.

Stabilizing Agents

The acidic destaining composition may also include a stabilizing agent. Examples of suitable stabilizing agents include, but are not limited to: borate, calcium/magnesium ions, propylene glycol, and mixtures thereof. The composition need not include a stabilizing agent, but when the composition includes a stabilizing agent, it can be included in an amount that provides the desired level of stability of the composition. Suitable ranges of the stabilizing agent include up to about 20 wt-%, about 0.5 to about 15 wt-%, or about 2 to about 10 wt-%.

Dispersants

The acidic destaining composition may also include a dispersant. Examples of suitable dispersants that can be used in the acidic destaining composition include, but are not limited to: maleic acid/olefin copolymers, polyacrylic acid, and mixtures thereof. The composition need not include a dispersant, but when a dispersant is included it can be included in an amount that provides the desired dispersant properties. Suitable ranges of the dispersant in the composition can be up to about 20 wt-%, about 0.5 to about 15 wt-%, or about 2 to about 9 wt-%.

Enzymes

Enzymes that can be included in the acidic destaining composition include those enzymes that aid in the removal of starch and/or protein stains. Suitable types of enzymes include, but are not limited to: proteases, alpha-amylases, and mixtures thereof. Suitable proteases that can be used include, but are not limited to: those derived from *Bacillus lichenifor-mix, Bacillus lenus, Bacillus alcalophilus*, and *Bacillus amyloliquefacins*. Suitable alpha-amylases include *Bacillus subtilis, Bacillus amyloliquefaciens*, and *Bacillus licheniformis*. The composition need not include an enzyme, but when the composition includes an enzyme, it can be included in an amount that provides the desired enzymatic activity when the acidic destaining composition is provided as a use composition. Suitable ranges of the enzyme in the composition include up to about 15 wt-%, about 0.5 to about 10 wt-%, or about 1 to about 5 wt-%.

Surfactants

The acidic destaining composition can contain an anionic surfactant component that includes a detersive amount of an anionic surfactant or a mixture of anionic surfactants. Anionic surfactants are desirable in acidic destaining compositions because of their wetting and detersive properties. The anionic surfactants that can be used according to the invention include any anionic surfactant available in the cleaning industry. Suitable groups of anionic surfactants include sulfonates and sulfates. Suitable surfactants that can be provided in the anionic surfactant component include alkyl aryl sulfonates, secondary alkane sulfonates, alkyl methyl ester sulfonates, alpha olefin sulfonates, alkyl ether sulfates, alkyl sulfates, and alcohol sulfates.

Suitable alkyl aryl sulfonates that can be used in the acidic destaining composition can have an alkyl group that contains 6 to 24 carbon atoms and the aryl group can be at least one of benzene, toluene, and xylene. An suitable alkyl aryl sulfonate includes linear alkyl benzene sulfonate. A suitable linear alkyl benzene sulfonate includes linear dodecyl benzyl sulfonate. Additional suitable alkyl aryl sulfonates include xylene sulfonate and cumene sulfonate.

Suitable alkane sulfonates that can be used in the acidic destaining composition can have an alkane group having 6 to 24 carbon atoms. Suitable alkane sulfonates that can be used include secondary alkane sulfonates. A suitable secondary alkane sulfonate includes sodium $C_{14}$-$C_{17}$ secondary alkyl sulfonate commercially available as Hostapur SAS from Clariant.

Suitable alkyl methyl ester sulfonates that can be used in the acidic destaining composition include those having an alkyl group containing 6 to 24 carbon atoms. Suitable alpha olefin sulfonates that can be used in the acidic destaining composition include those having alpha olefin groups containing 6 to 24 carbon atoms.

Suitable alkyl ether sulfates that can be used in the acidic destaining composition include those having between about 1 and about 10 repeating alkoxy groups, between about 1 and about 5 repeating alkoxy groups. In general, the alkoxy group will contain between about 2 and about 4 carbon atoms. A suitable alkoxy group is ethoxy. A suitable alkyl ether sulfate is sodium lauric ether ethoxylate sulfate and is available under the name Steol CS-460.

Suitable alkyl sulfates that can be used in the acidic destaining composition include those having an alkyl group containing 6 to 24 carbon atoms. Suitable alkyl sulfates include sodium laurel sulfate and sodium laurel/myristyl sulfate.

Suitable alcohol sulfates that can be used in the acidic destaining composition include those having an alcohol group containing about 6 to about 24 carbon atoms.

The anionic surfactant can be neutralized with an alkaline metal salt, an amine, or a mixture thereof. Suitable alkaline metal salts include sodium, potassium, and magnesium. Suitable amines include monoethanolamine, triethanolamine, and monoisopropanolamine. If a mixture of salts is used, an suitable mixture of alkaline metal salt can be sodium and magnesium, and the molar ratio of sodium to magnesium can be between about 3:1 and about 1:1.

The acidic destaining composition, when provided as a concentrate, can include the anionic surfactant component in an amount sufficient to provide a use composition having desired wetting and detersive properties after dilution with water. In general, the concentrate can be provided as a solid or as a liquid. When the concentrate is provided as a liquid, it can be provided in a form that is readily flowable so that it can be pumped or aspirated. It is additionally desirable to minimize the amount of water while preserving the flowable properties of the concentrate when it is provided as a liquid. The concentrate can contain about 0.1 wt-% to about 0.5 wt-%, about 0.1 wt-% to about 1.0 wt-%, about 1.0 wt-% to about 5 wt-%, about 5 wt-% to about 10 wt-%, about 10 wt % to about 20 wt-%, 30 wt-%, about 0.5 wt-% to about 25 wt-%, and about 1 wt-% to about 15 wt-%, and similar intermediate concentrations of the anionic surfactant.

The acidic destaining composition can contain a nonionic surfactant component that includes a detersive amount of nonionic surfactant or a mixture of nonionic surfactants. Nonionic surfactants can be included in the acidic destaining composition to enhance grease removal properties. Although the surfactant component can include a nonionic surfactant component, it should be understood that the nonionic surfactant component can be excluded from the detergent composition, if desired.

Nonionic surfactants that can be used in the composition include polyalkylene oxide surfactants (also known as polyoxyalkylene surfactants or polyalkylene glycol surfactants). Suitable polyalkylene oxide surfactants include polyoxypropylene surfactants and polyoxyethylene glycol surfactants. Suitable surfactants of this type are synthetic organic polyoxypropylene (PO)-polyoxyethylene (EO) block copolymers. These surfactants comprise a di-block polymer comprising an EO block and a PO block, a center block of polyoxypropylene units (PO), and having blocks of polyoxyethylene grafted onto the polyoxypropylene unit or a center block of EO with attached PO blocks. Further, this surfactant can have further blocks of either polyoxyethylene or polyoxypropylene in the molecules. An suitable average molecular weight range of useful surfactants can be about 1,000 to about 40,000 and the weight percent content of ethylene oxide can be about 10-80 wt-%.

Additional nonionic surfactants include alcohol alkoxylates. An suitable alcohol alkoxylate include linear alcohol ethoxylates such as Tomadol™ 1-5 which is a surfactant containing an alkyl group having 11 carbon atoms and 5 moles of ethylene oxide. Additional alcohol alkoxylates include alkylphenol ethoxylates, branched alcohol ethoxylates, secondary alcohol ethoxylates (e.g., Tergitol 15-S-7 from BASF), castor oil ethoxylates, alkylamine ethoxylates, tallow amine ethoxylates, fatty acid ethoxylates, sorbital oleate ethoxylates, end-capped ethoxylates, or mixtures thereof. Additional nonionic surfactants include amides such as fatty alkanolamides, alkyldiethanolamides, coconut diethanolamide, lauramide diethanolamide, cocoamide diethanolamide, polyethylene glycol cocoamide (e.g., PEG-6 cocoamide), oleic diethanolamide, or mixtures thereof. Additional suitable nonionic surfactants include polyalkoxylated aliphatic base, polyalkoxylated amide, glycol esters, glycerol esters, amine oxides, phosphate esters, alcohol phosphate, fatty triglycerides, fatty triglyceride esters, alkyl ether phosphate, alkyl esters, alkyl phenol ethoxylate phosphate esters, alkyl polysaccharides, block copolymers, alkyl polyglucosides, or mixtures thereof.

When nonionic surfactants are included in the detergent composition concentrate, they can be included in an amount of at least about 0.1 wt-% and can be included in an amount of up to about 15 wt-%. The concentrate can include about 0.1 to 1.0 wt-%, about 0.5 wt-% to about 12 wt-% or about 2 wt-% to about 10 wt-% of the nonionic surfactant.

Amphoteric surfactants that can be used to provide desired detersive properties. Suitable amphoteric surfactants that can be used include the betaines, imidazolines, and propionates. Suitable amphoteric surfactants include sultaines, amphopropionates, amphrodipropionates, aminopropionates, aminodipropionates, amphoacetates, amphodiacetates, and amphohydroxypropylsulfonates.

The detergent composition concentrate can be provided without any amphoteric surfactant. When the detergent composition includes an amphoteric surfactant, the amphoteric surfactant can be included in an amount of about 0.1 wt-% to about 15 wt-%. The concentrate can include about 0.1 wt-% to about 1.0 wt-%, 0.5 wt-% to about 12 wt-% or about 2 wt-% to about 10 wt-% of the amphoteric surfactant.

The acidic destaining composition can contain a cationic surfactant component that includes a detersive amount of cationic surfactant or a mixture of cationic surfactants. The cationic surfactant can be used to provide sanitizing properties. Although the surfactant component can include a cationic surfactant component, it should be understood that the cationic surfactant component can be excluded from the detergent composition, if desired.

Cationic surfactants that can be used in the detergent composition include, but are not limited to: amines such as primary, secondary and tertiary monoamines with $C_{1-8}$ alkyl or alkenyl chains, ethoxylated alkylamines, alkoxylates of ethylenediamine, imidazoles such as a 1-(2-hydroxyethyl)-2-imidazoline, a 2-alkyl-1-(2-hydroxyethyl)-2-imidazoline, and the like; and quaternary ammonium salts, as for example, alkylquaternary ammonium chloride surfactants such as n-alkyl($C_{12}$-$C_{18}$)dimethylbenzyl ammonium chloride, n-tetradecyldimethylbenzylammonium chloride monohydrate, and a naphthylene-substituted quaternary ammonium chloride such as dimethyl-1-naphthylmethylammonium chloride.

The acidic destaining composition can contain a zwitterionic surfactant component that includes a detersive amount of zwitterionic surfactant or a mixture of zwitterionic surfactants. Although the surfactant component can include a zwitterionic surfactant component, it should be understood that the zwitterionic surfactant component can be excluded from the detergent composition, if desired.

Examples of zwitterionic surfactants that can be used in the detergent composition include, but are not limited to: betaines, imidazolines, and propionates.

Solvent or Water Component

The concentrate can be provided in the form of a solid, a liquid, or gel, or a combination thereof. The concentrate can be formulated without any water or can be provided with a relatively small amount of water in order to reduce the expense of transporting the concentrate. When the concentrate is provided as a liquid, it may be desirable to provide it in a flowable form so that it can be pumped or aspirated. It has been found that it is generally difficult to accurately pump a small amount of a liquid. It is generally more effective to pump a larger amount of a liquid. Accordingly, although it is desirable to provide the concentrate with as little as possible in order to reduce transportation costs, it is also desirable to provide a concentrate that can be dispensed accurately. As a result, a concentrate according to the invention, when it includes water, it can include water in an amount of about 0.1 wt-% to about 99 wt-%, about 30 wt-% to about 95 wt-%, and about 40 wt-% to about 90 wt-%.

It should be understood that the water provided as part of the concentrate can be relatively free of hardness. It is expected that the water can be deionized to remove a portion of the dissolved solids. The concentrate is then diluted with water available at the locale or site of dilution and that water may contain varying levels of hardness depending upon the locale. Although deionized can be used for formulating the concentrate, the concentrate also can be formulated with water that has not been deionized. That is, the concentrate can be formulated with water that includes dissolved solids, and can be formulated with water that can be characterized as hard water.

Additional Acidulant

The acid compositions of the present invention have pKa values of less than or equal to 3. The acidic destaining composition can include an additional acidulant. In an aspect, suitable additional acidulants or acids include organic acids. For example, suitable organic acids include lactic acid, citric acid, propionic acid, acetic acid, hydroxyacetic acid, formic acid, glutaric acid, malic acid, hydroxy propionic acid, succinic acid, glutaric acid, adipic acid, fumaric acid, mixtures thereof, or the like. The organic acid can be a mixture of adipic, malic, and succinic acids sold under the tradename Sokalan. In an embodiment, the acid includes citric acid, lactic acid, urea hydrochloride, or a mixture thereof. In another aspect, suitable acids include inorganic or mineral acids, such as, for example, hydrochloric acid, nitric acid, sulfuric acid, sulfamic acid, urea dihydrogen sulfate and mixtures thereof, or the like, but not including phosphoric acid. In an embodiment, the present invention includes a combination of acidulants, such as, for example, citric acid, lactic acid, urea hydrochloride, or a mixture thereof.

The additional acidulant or acid can be present in the composition at about 0.01 to about 85 wt-%, about 0.1 to about 70 wt-%, about 0.3 to about 3 wt-%, or about 1 to about 5 wt-%.

Dyes and Fragrances

Various dyes, odorants including perfumes, and other aesthetic enhancing agents may also be included in the composition. Dyes may be included to alter the appearance of the composition, as for example, any of a variety of FD&C dyes, D&C dyes, and the like. Additional suitable dyes include Direct Blue 86 (Miles), Fastusol Blue (Mobay Chemical Corp.), Acid Orange 7 (American Cyanamid), Basic Violet 10 (Sandoz), Acid Yellow 23 (GAF), Acid Yellow 17 (Sigma Chemical), Sap Green (Keyston Analine and Chemical), Metanil Yellow (Keystone Analine and Chemical), Acid Blue 9 (Hilton Davis), Sandolan Blue/Acid Blue 182 (Sandoz), Hisol Fast Red (Capitol Color and Chemical), Fluorescein (Capitol Color and Chemical), Acid Green 25 (Ciba-Geigy), Pylakor Acid Bright Red (Pylam), and the like. Fragrances or perfumes that may be included in the compositions include, for example, terpenoids such as citronellol, aldehydes such as amyl cinnamaldehyde, a jasmine such as C1S-jasmine or jasmal, vanillin, and the like.

Adjuvants

The present composition can also include any number of adjuvants. Specifically, the composition can include stabilizing agents, wetting agents, thickeners, foaming agents, corrosion inhibitors, biocides, hydrogen peroxide, pigments or dyes among any number of other constituents which can be added to the composition. Such adjuvants can be preformulated with the present composition or added to the system simultaneously, or even after, the addition of the present composition. The composition can also contain any number of other constituents as necessitated by the application, which are known and which can facilitate the activity of the present compositions.

Use Compositions

The compositions of the present invention can be provided in the form of a concentrate or a use solution. In general, a concentrate refers to a composition that is intended to be diluted with water to provide a use solution that contacts an object to provide the desired cleaning, rising, or the like. In an embodiment, when the composition is provided as a concentrate, the concentrate includes between about 100 parts per million (ppm) to about 5000 ppm acidic destaining composition. The use solution can include additional functional ingredients at a level suitable for cleaning, rinsing, or the like. In an embodiment, the use solution includes additional functional ingredients at about 0 to about 0.75 wt-%.

A use solution may be prepared from the concentrate by diluting the concentrate with water at a dilution ratio that provides a use solution having desired stain removal properties. In an exemplary embodiment, the concentrate may be diluted at a weight ratio of diluent to concentrate of at least about 20:1 or about 20:1 to about 2000:1. In an embodiment, when the composition is provided as a use solution, the use solution includes about 0.1 to about 200 ppm acidic destaining composition or about 1 to about 100 ppm acidic destaining composition. In an embodiment, the use solution includes about 3 to about 75 ppm acidic composition.

The concentrate may be diluted with water at the location of use to provide the use solution. When the destaining/decolorizing composition is used in an automatic warewashing or dishwashing machine, it is expected that that the location of use will be inside the automatic warewashing machine. For example, when the composition is used in a residential warewashing machine, the composition may be placed in the detergent compartment of the warewashing machine. Depending on the machine, the acidic destaining composition may be provided in a unit dose form or in a multi-use form. In larger warewashing machines, a large quantity of composition may be provided in a compartment that allows for the release of a single dose amount of the composition for each wash cycle. Such a compartment may be provided as part of the warewashing machine or as a separate structure connected to the warewashing machine. For example, a block of the acidic destaining composition may be provided in a hopper and introduced into the warewashing machine when water is sprayed against the surface of the block to provide a liquid concentrate.

The acidic destaining composition may also be dispensed from a spray-type dispenser. Briefly, a spray-type dispenser functions by impinging a water spray upon an exposed surface of the detergent composition to dissolve a portion of the detergent composition, and then immediately directing the use solution out of the dispenser to a storage reservoir or directly to a point of use. When used, the product may be removed from the packaging (e.g. film) and inserted into the dispenser. The spray of water may be made by a nozzle in a shape that conforms to the shape of the solid composition. The dispenser enclosure may also closely fit the shape of the composition to prevent introducing and dispensing an incorrect composition.

Solid Acidic Destaining Compositions

In some embodiments, the present invention also relates to solid acidic destaining compositions comprising the acidic destaining composition with reducing agents. For example, the present invention includes a cast solid block of the composition. By way of further example, the present invention includes compositions comprising a pressed solid block.

According to the present invention, a solid composition can be prepared by a method including: providing a powder or crystalline form of the composition; melting the powder or crystalline form of the composition; transferring the molten acidic destaining composition into a mold; and cooling the molten composition to solidify it.

According to the present invention, a solid composition can also be prepared by a method including: providing a powder or crystalline form of the composition; gently pressing the same to form a solid (e.g., block or puck).

A solid destaining or rinsing composition as used in the present disclosure encompasses a variety of forms including, for example, solids, pellets, blocks, and tablets, but not powders. It should be understood that the term "solid" refers to the state of the detergent composition under the expected conditions of storage and use of the solid acidic destaining composition. In general, it is expected that the detergent composition will remain a solid when provided at a temperature of up to about 100° F. or greater than 120° F.

In certain embodiments, the solid acidic destaining composition is provided in the form of a unit dose. A unit dose refers to a solid acidic destaining composition unit sized so that the entire unit is used during a single washing cycle. When the solid composition is provided as a unit dose, it can have a mass of about 1 g to about 50 g. In other embodiments, the composition can be a solid, a pellet, or a tablet having a size of about 50 g to 250 g, of about 100 g or greater, or about 40 g to about 11,000 g.

In other embodiments, the solid composition is provided in the form of a multiple-use solid, such as, a block or a plurality of pellets, and can be repeatedly used to generate aqueous acidic compositions for multiple uses. In certain embodiments, the solid composition is provided as a solid having a mass of about 5 g to 10 kg. In certain embodiments, a multiple-use form of the solid composition has a mass of about 1 to 10 kg. In further embodiments, a multiple-use form of the solid composition has a mass of about 5 kg to about 8 kg. In other embodiments, a multiple-use form of the solid composition has a mass of about 5 g to about 1 kg, or about 5 g and to 500 g.

Packaging System

In some embodiments, the solid composition can be packaged. The packaging receptacle or container may be rigid or flexible, and composed of any material suitable for containing the compositions produced according to the invention, as for example glass, metal, plastic film or sheet, cardboard, cardboard composites, paper, and the like.

Advantageously, since the composition is processed at or near ambient temperatures, the temperature of the processed mixture is low enough so that the mixture may be formed directly in the container or other packaging system without structurally damaging the material. As a result, a wider variety of materials may be used to manufacture the container than those used for compositions that processed and dispensed under molten conditions.

Suitable packaging used to contain the compositions is manufactured from a flexible, easy opening film material.

Dispensing of the Processed Compositions

The composition according to the present invention can be dispensed in any suitable method generally known. The cleaning or rinsing composition can be dispensed from a spray-type dispenser such as that disclosed in U.S. Pat. Nos. 4,826,661, 4,690,305, 4,687,121, 4,426,362 and in U.S. Pat. Nos. Re 32,763 and 32,818, the disclosures of which are incorporated by reference herein. Briefly, a spray-type dispenser functions by impinging a water spray upon an exposed surface of the solid composition to dissolve a portion of the composition, and then immediately directing the concentrate solution including the composition out of the dispenser to a storage reservoir or directly to a point of use. When used, the product is removed from the package (e.g.) film and is inserted into the dispenser. The spray of water can be made by a nozzle in a shape that conforms to the solid shape. The dispenser enclosure can also closely fit the detergent shape in a dispensing system that prevents the introduction and dispensing of an incorrect detergent. The aqueous concentrate is generally directed to a use locus.

In an embodiment, the present composition can be dispensed by immersing either intermittently or continuously in water. The composition can then dissolve, for example, at a controlled or predetermined rate. The rate can be effective to maintain a concentration of dissolved cleaning agent that is effective for cleaning.

In an embodiment, the present composition can be dispensed by scraping solid from the solid composition and contacting the scrapings with water. The scrapings can be added to water to provide a concentration of dissolved cleaning agent that is effective for cleaning Methods Employing the Present Compositions It is contemplated that the acidic destaining compositions of the invention can be used in a broad variety of industrial, household, health care, vehicle care, and other such applications. Some examples include surface disinfectant, ware cleaning, laundry cleaning, laundry sanitizing, vehicle cleaning, floor cleaning, surface cleaning, pre-soaks, clean in place, and a broad variety of other such applications.

In some aspects, the present invention relates to a method of removing/decolorizing metal stains from an object, comprising contacting the object with an aqueous composition comprising water, and the acidic composition of the invention for a time sufficient to remove and decolorize stains. In certain embodiments the contacting may be done at higher than standard temperatures, for example up to 160° to decrease soaking time.

Contacting can include any of numerous methods for applying a composition, such as spraying the composition, immersing the object in the composition, or a combination thereof. The compositions can be applied in a variety of areas including kitchens, bathrooms, factories, hospitals, dental offices and food plants, and can be applied to a variety of hard surfaces having smooth, irregular or porous topography. A use concentration of a composition of the present invention can be applied to or brought into contact with an object by any conventional method or apparatus for applying a acidic destaining composition to an object. For example, the object can be wiped with, sprayed with, and/or immersed in the composition, or a use solution made from the composition. The composition can be sprayed, or wiped onto a surface; the composition can be caused to flow over the surface, or the surface can be dipped into the composition. Contacting can be manual or by machine.

Exemplary articles that can be treated, i.e., cleaned, with the use solution comprising a detersive composition and treated water include, but are not limited to motor vehicle exteriors, textiles, food contacting articles, clean-in-place (CIP) equipment, health care surfaces and hard surfaces. Exemplary motor vehicle exteriors include cars, trucks, trailers, buses, etc. that are commonly washed in commercial vehicle washing facilities. Exemplary textiles include, but are not limited to, those textiles that generally are considered within the term "laundry" and include clothes, towels, sheets, etc. In addition, textiles include curtains. Exemplary food contacting articles include, but are not limited to, dishes, glasses, eating utensils, bowls, cooking articles, food storage articles, etc. Exemplary CIP equipment includes, but is not limited to, pipes, tanks, heat exchangers, valves, distribution circuits, pumps, etc. Exemplary health care surfaces include, but are not limited to, surfaces of medical or dental devices or instruments. Exemplary hard surfaces include, but are not limited to, floors, counters, glass, walls, etc. Hard surfaces can also include the inside of dish machines, and laundry machines. In general, hard surfaces can include those surfaces commonly referred to in the cleaning industry as environmental surfaces. Such hard surfaces can be made from a variety of materials including, for example, ceramic, metal, glass, wood or hard plastic.

The present invention may be better understood with reference to the following examples. These examples are intended to be representative of specific embodiments of the invention, and are not intended as limiting the scope of the invention.

The Process of Cleaning a Hard-Surface or an Object

The present invention further encompasses a process of cleaning a hard surface or an object, preferably removing metal stains and limescale from said hard-surface or said object.

The process according to the present invention comprises the steps of: applying a liquid acidic hard surface acidic destaining composition comprising reducing agents and having a pH of between about 3 and about 4, preferably from about 3.1 to about 3.9, more preferably from about 3.2 to about 3.9, even more preferably about 3.5 to about 4.0, and most preferably from about 3.6 to about 3.9; and mixtures thereof, onto said hard-surface or said object; leaving said composition on said hard-surface or said object to act; optionally wiping said hard-surface or object and/or providing mechanical agitation, and then rinsing said hard-surface or said object.

By "hard-surface", it is meant herein any kind of surfaces typically found in and around houses like bathrooms, kitchens, basements and garages, e.g., floors, walls, tiles, windows, sinks, showers, shower plastified curtains, wash basins, WCs, dishes, fixtures and fittings and the like made of different materials like ceramic, enamel, painted and un-painted concrete, plaster, bricks, vinyl, no-wax vinyl, linoleum, melamine, Formica®, glass, any plastics, metals, chromed surface and the like. The term surfaces as used herein also include household appliances including, but not limited to, washing machines, automatic dryers, refrigerators, freezers, ovens, microwave ovens, dishwashers and so on. Preferred hard surfaces cleaned with the liquid aqueous acidic hard surface acidic destaining composition herein are those located in a bathroom, in a toilet or in a kitchen, basements, garages as well as outdoor such as garden furniture, gardening equipment, driveways etc.

The objects herein are objects that are subjected to limescale formation thereon. Such objects may be water-taps or parts thereof, water-valves, metal objects, objects made of stainless-steel, cutlery and the like.

The preferred process of cleaning a hard-surface or an object (preferably removing limescale from said hard-surface or said object) comprises the step of applying a composition according to the present invention onto said hard-surface or object, leaving said composition on said hard-surface or object to act, preferably for an effective amount of time, more preferably for a period comprised between 1 and 10 minutes, most preferably for a period comprised between 2 and 4 minutes; optionally wiping said hard-surface or object with an appropriate instrument, e.g. a sponge; and then preferably rinsing said surface with water.

Even though said hard-surface or object may optionally be wiped and/or agitated during the process herein, it has been surprisingly found that the process of the present invention allows good limescale removal performance without any additional mechanical wiping and/or agitation action. The lack of need for additional wiping and/or mechanical; agitation provides an added convenience for the user of the compositions herein.

In another execution of the present invention is provided a process of cleaning an object, preferably removing limescale from an object, comprising the step of immersing said object in a bath comprising a composition according to the present invention, leaving said object in said bath for the composition to act, preferably for an effective amount of time, more preferably for a period comprised between 1 and 10 minutes, most preferably for a period comprised between 2 and 4 minutes; and then preferably rinsing said object with water.

The compositions of the present invention may be contacted to the surface or the object to be treated in its neat form or in its diluted form. Preferably, the composition is applied in its neat form.

By "diluted form", it is meant herein that said composition is diluted by the user, typically with water. The composition is diluted prior use to a typical dilution level of 10 to 400 times its weight of water, preferably from 10 to 200 and more preferably from 10 to 100. Usual recommended dilution level is a 1.2% dilution of the composition in water.

The compositions according to the present invention are particularly suitable for treating hard-surfaces located in and around the house, such as in bathrooms, toilets, garages, on driveways, basements, gardens, kitchens, etc., and preferably in bathrooms. It is however known that such surfaces (especially bathroom surfaces) may be soiled by the so-called "limescale-containing soils". By "limescale-containing soils" it is meant herein any soil which contains not only limescale mineral deposits, such as calcium and/or magnesium carbonate, but also soap scum (e.g., calcium stearate) and other grease (e.g. body grease). By "limescale deposits" it is mean herein any pure limescale soil, i.e., any soil or stains composed essentially of mineral deposits, such as calcium and/or magnesium carbonate.

The compositions herein may be packaged in any suitable container, such as bottles, preferably plastic bottles, optionally equipped with an electrical or manual trigger spray-head.

Exemplary Formulations

Examples of useful ranges for the basic composition for the acid acidic destaining composition of the invention include those provided in the following table with any remaining percentage being water.

| Component | Weight percent | Weight percent | Weight percent |
|---|---|---|---|
| Acid component | .0001-50 | .01-40 | .1-30 |
| Reducing agent | .01-10 | .05-8 | .1-5 |
| Crystal modifier | 0-60 | 10-55 | 20-50 |
| Corrosion inhibitor | 0-5 | .001-3 | .01-1 |
| Anti-foam | .0001-10 | .001-5 | .01-1 |
| Solidification agent | 0-60 | 10-50 | 20-40 |
| Dissolution aid | 0-10 | .01-8 | .1-5 |

The invention has been shown and described herein in what is considered to be the most practical and preferred embodiment. The applicant recognizes, however, that departures may be made therefrom within the scope of the invention and that obvious modifications will occur to a person skilled in the art. The examples which follow are intended for purposes of illustration only and are not intended to limit the scope of the invention. All references cited herein are hereby incorporated in their entirety by reference.

EXAMPLES

A dish machine used to evaluate experimental acidic metal stain removal/decolorization compositions. The doors from the machine were cut into coupons. These coupons were then soaked in sample acid solutions until they were visibly clean. The solution was then analyzed to determine the components of the iridescent staining. The staining was found to be composed mostly of copper, iron, zinc and manganese. Various reducing agents were evaluated for the rate at which the metal stain was removed upon soaking in solution. Additional machine doors were also tested, however they were discolored with a primarily iron stain, not an iridescent multi metal stain. The soak solution concentration was 1.5% in water at 160° F. until the discoloration was removed, up to 15 minutes, which is the upper limit contact time listed on the product label.

Table 1 shows the generic formulas including a range of concentrations of reducing agents.

TABLE 1

| Chemical Name | Reducing Agent 0.1% | Reducing Agent 0.25% | Reducing Agent 0.5% | Reducing Agent 1% | Reducing Agent 3% |
|---|---|---|---|---|---|
| Polyoxypropyl Polyoxyethyl Polymer (dissolution aid) | 3.162 | 3.162 | 3.162 | 3.162 | 3.162 |
| Polyoxyethylene Polyoxypropylene Block Polymer (dissolution aid) | 1.265 | 1.265 | 1.265 | 1.265 | 1.265 |
| dye | 0.005 | 0.005 | 0.005 | 0.005 | 0.005 |
| Silicone Antifoam | 0.03 | 0.03 | 0.03 | 0.03 | 0.03 |
| Citric Acid, USP, Anhydrous Gran. (crystal modifier) | 47.966 | 47.816 | 47.566 | 47.066 | 45.066 |
| Sulfamic Acid Acid source | 11.384 | 11.384 | 11.384 | 11.384 | 11.384 |
| Copper Sulfate (pentahydrate) (corrosion inhibitor) | 0.02 | 0.02 | 0.02 | 0.02 | 0.02 |
| Sulfuric Acid 93% Technical (acid source) | 8.854 | 8.854 | 8.854 | 8.854 | 8.854 |
| Urea Liquor 50% Solidification aid | 27.214 | 27.214 | 27.214 | 27.214 | 27.214 |
| Various Reducing Agents | 0.1 | 0.25 | 0.5 | 1 | 3 |

The various reducing agents tested at difference concentrations are listed in Table 2:

TABLE 2

| Reducing Agent | Reducing agent concentration in final product (%) | Time (Min:Sec) |
|---|---|---|
| Syringic Acid | 3 | 7:30 |
| Syringic Acid | 1 | 10:28 |
| Syringic Acid | 1 | 5:21 |
| Mg L Ascorbate | 1 | 6:45 |
| Mg L Ascorbate | 3 | 4:38 |
| Mg L Ascorbate | 1 | 8:15 |
| Ascorbic Acid | 1 | 5:21 |
| Caffeic Acid | 1 | 10:00 |
| Caffeic Acid | 3 | 2:40 |
| 3,3-Thiodipropionic Acid | 1 | 7:45 |
| Ascorbic Acid | 1 | 0:40 |
| Sodium Metabisulfite | 1 | 7:05 |
| Catechol | 1 | 3:15 |
| Catechol | 3 | 1:55 |
| Inline SLAW - No reducing agent | 0 | 15:00, 15:00 - coupon remains iridescent, most color removed |
| Inline SLAW - No reducing agent | 0 | 12:00 |
| Sodium Hydrosulfite | 1 | 4:53 |
| Sodium Hydrosulfite | 3 | 2:46 |
| Maltol | 1 | 4:20 |
| Maltol | 3 | 2:55 |

TABLE 2-continued

| Reducing Agent | Reducing agent concentration in final product (%) | Time (Min:Sec) |
| --- | --- | --- |
| Ethyl Maltol | 1 | 6:33 |
| Ethyl Maltol | 0.75 | 7:43 |
| Ethyl Maltol | 0.5 | 10:08 |
| Ethyl Maltol | 0.25 | 6:33 |
| Ethyl Maltol | 0.1 | 5:20 |
| Ethyl Maltol | 1 | 6:15 |
| Ethyl Maltol | 0.75 | 5:14 |
| Ethyl Maltol | 0.5 | 7:33 |
| Ethyl Maltol | 0.25 | 6:45 |
| Ethyl Maltol | 0.1 | 8:55 |
| trans-Cinnamic Acid | 1 | 5:38 |
| Hydroquinone | 1 | 3:46 |
| Pyrogallol | 1 | 3:55 |
| p-Coumaric Acid | 1 | 15:00, 15:00 - coupon not colored but still iridescent |
| Mucic Acid | 1 | 6:07 |
| Gallic Acid | 1 | 3:13 |
| Hydroxypropyl Cellulose | 1 | 15:00, 15:00 - coupon not colored but still very iridescent |
| Ascorbic Acid | 0.75 | 6:13 |
| Ascorbic Acid | 0.5 | 6:43 |
| Ascorbic Acid | 0.25 | 6:37 |
| Ascorbic Acid | 0.1 | 9:29 |
| Salicylic Acid | 1 | 4:48 |
| Benzyl Alcohol | 1 | 8:37 |
| Maltol | 0.1 | 7:19 |
| Salicylic Acid | 0.75 | 5:08 |
| Salicylic Acid | 0.5 | 6:03 |
| Salicylic Acid | 0.25 | 7:33 |
| Salicylic Acid | 0.1 | 10:10 |
| Maltol | 0.75 | 7:27 |
| Maltol | 0.5 | 5:41 |
| Maltol | 0.25 | 4:29 |
| Syringic Acid | 0.25 | 5:54 |
| Syringic Acid | 0.1 | 7:32 |

As can be seen, the reducing agents of Ascorbic Acid, Sodium Metabisulfite, Caffeic Acid, Syringic Acid, Magnesium L-Ascorbate, Maltol, Ethyl Maltol, Sodium Hydrosulfite, Catechol, Benzyl Alcohol, trans-Cinnamic Acid, Hydroquinone, Pyrogallol, p-Coumaric Acid, Mucic Acid, Gallic Acid, Hydroxypropyl Cellulose, and 3,3-Thiodipropionic Acid all removed metal stains in an acidic solution.

What is claimed is:

1. An acidic metal stain removal/decolorization composition comprising:
   from about 0.01% to about 40% by weight of an organic or inorganic acid;
   from about 10% to about 50% by weight of a solidification agent;
   from about 0.0001% to about 10% by weight of a defoamer; and
   from about 0.01% to about 10% by weight of a reducing agent with the remainder being water;
   wherein the composition provides an aqueous solution of a pH less than 7.

2. The composition of claim 1 wherein said reducing agent is selected from the group consisting of Ascorbic Acid, Sodium Metabisulfite, Caffeic Acid, Syringic Acid, Magnesium L-Ascorbate, Maltol, Ethyl Maltol, Sodium Hydrosulfite, Catechol, Benzyl Alcohol, trans-Cinnamic Acid, Hydroquinone, Pyrogallol, p-Coumaric Acid, Mucic Acid, Gallic Acid, Hydroxypropyl Cellulose, and 3,3-Thiodipropionic Acid.

3. The composition of claim 1 wherein said composition is does not contain phosphoric acid.

4. The composition of claim 1 wherein said composition is a solid composition.

5. The composition of claim 4 further comprising a solidification aid.

6. The composition of claim 5 further comprising a dissolution aid.

7. The composition of claim 5 further comprising from about 40%-50% by weight of urea.

8. The composition of claim 5 further comprising from about 0.1 to about 10% by weight of a dissolution aid including one or more of a polyoxypropyl, polyoxyethyl, polyoxyethyl, or polyoxypropylene polymer.

9. The composition of claim 1 further comprising a corrosion inhibitor and/or a crystal modifier.

10. A method of removing/decolorizing metal stains from a surface, the method comprising:
   (a) contacting the surface with a solution having a pH less than 7, wherein the composition comprises: an acidic composition, the concentrate composition comprising:
      (i) from about 0.01% to about 40% by weight of an organic or inorganic acid;
      (ii) from about 0.01% to about 10% by weight of a reducing agent;
      (iii) from about 10% to about 50% by weight of a solidification agent; and
      (iv) from about 0.0001% to about 10% by weight of a defoamer; and
   (b) rinsing the surface.

11. The method of claim 10, wherein acidic composition does not contain phosphoric acid.

12. The method of claim 10 wherein said reducing agent is one or more agents selected from the group consisting of Ascorbic Acid, Sodium Metabisulfite, Caffeic Acid, Syringic Acid, Magnesium L-Ascorbate, Maltol, Ethyl Maltol, Sodium Hydrosulfite, Catechol, Benzyl Alcohol, trans-Cinnamic Acid, Hydroquinone, Pyrogallol, p-Coumaric Acid, Mucic Acid, Gallic Acid, Hydroxypropyl Cellulose, and 3,3-Thiodipropionic Acid.

13. The method of claim 10, wherein the reducing agent is catechol or derivatives or analogues thereof.

14. The method of claim 10 further comprising the step of diluting said concentrate with water to form a use solution.

15. The method of claim 10 wherein said object includes: bathrooms, toilets, garages, driveways, basements, gardens, kitchens, food and beverage equipment, medical instruments, destaining instrument washers, vehicles, dish machine flatware, and food contact surfaces.

16. The method of claim 10 wherein said metal stains include one or more of iron, manganese and/or copper stains.

17. A method of removing hard water stains, iron stains and other metal stains from surfaces comprising:
   obtaining a solid acidic concentrate comprising:
   a) an acid;
   b) a reducing agent selected from the group consisting of Ascorbic Acid, Sodium Metabisulfite, Caffeic Acid, Syringic Acid, Magnesium L-Ascorbate, Maltol, Ethyl Maltol, Sodium Hydrosulfite, Catechol, Benzyl Alcohol, trans-Cinnamic Acid Hydroquinone, Pyrogallol, p-Coumaric Acid, Mucic Acid, Gallic. Acid, Hydroxypropyl Cellulose, and 3,3-Thiodipropionic Acid;
   c) a solidification agent comprising urea, wherein the solidification agent comprises between about 10% and about 50% by weight of the solid acidic concentrate; and
   d) a defoamer comprising between about 0.0001% and about 10% by weight of the solid acidic concentrate;

dissolving said concentrate to form a use solution having a pH less than 7;
contacting said use solution with said surface for a period of time sufficient to remove or decolor said metal stains; and
rinsing said surface.

18. The method of claim 17 wherein said concentrate comprises From about 0.01% to about 40% by weight of an organic or inorganic acid; and
from about 0.01% to about 10% by weight of a reducing agent.

19. The method of claim 17 further comprising the steps of:
Applying heat to said object and use solution so that stain removal time is lessened.

* * * * *